United States Patent
Fujii et al.

(10) Patent No.: US 8,996,262 B2
(45) Date of Patent: Mar. 31, 2015

(54) SKIP-SHIFT OPERATIONS FOR AUTOMATIC TRANSMISSION SYSTEMS

(71) Applicant: Ford Global Technologies, LLC, Dearborn, MI (US)

(72) Inventors: Yuji Fujii, Ann Arbor, MI (US); Davor Hrovat, Ann Arbor, MI (US); Gregory Michael Pietron, Canton, MI (US); Jeffrey Allen Doering, Canton, MI (US); Alex O'Connor Gibson, Ann Arbor, MI (US); Nimrod Kapas, Canton, MI (US); Joseph F Kucharski, Livonia, MI (US); Diana Yanakiev, Birmingham, MI (US); James Dottavio, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 13/914,332

(22) Filed: Jun. 10, 2013

(65) Prior Publication Data

US 2014/0365085 A1 Dec. 11, 2014

(51) Int. Cl.
*G06F 7/00* (2006.01)
*F16H 61/68* (2006.01)

(52) U.S. Cl.
CPC ..................................... *F16H 61/68* (2013.01)
USPC .............. 701/54; 701/52; 74/473.12; 74/335

(58) Field of Classification Search
CPC ................ B60W 10/10; B60W 10/11; B60W 2510/1005; F16H 61/0204; F16H 61/0213; F16H 2061/0444; F16H 2061/0448
See application file for complete search history.

(56) References Cited

U.S. PATENT DOCUMENTS

| | | | |
|---|---|---|---|
| 6,520,039 B2 * | 2/2003 | Ogami et al. | 74/335 |
| 7,962,268 B2 * | 6/2011 | Cho | 701/51 |
| 8,065,063 B2 * | 11/2011 | Cho | 701/51 |
| 2013/0110360 A1 * | 5/2013 | Saito et al. | 701/51 |

* cited by examiner

*Primary Examiner* — David D Le
(74) *Attorney, Agent, or Firm* — Joseph E. Root

(57) ABSTRACT

Method and system providing manual skip-shift for operating the automatic transmission of a vehicle. The method includes accepting the input of gear states by operating a selector mechanism to select a value. The system accepts input of a selected sequence of gear states from a plurality of available gear states, the selected sequence including fewer gear states than the number of available gear states. The system then operates a selector mechanism to select the gear state from the selected sequence. The system also includes an electronic control module, a selector mechanism, and a power train control module.

18 Claims, 3 Drawing Sheets

SKIP-SHIFT OPERATIONS FOR AUTOMATIC TRANSMISSION SYSTEMS

TECHNICAL FIELD

Embodiments of the present disclosure generally relate to automotive transmission systems, and, more specifically, to methods and system for managing gear-shift operations in vehicles incorporating automatic transmission system.

BACKGROUND

Many contemporary automobiles incorporate automatic transmissions. An automatic transmission automatically changes the gear ratio according to the speed and load of a vehicle, avoiding the need for the driver to manually shift a gear lever. Most automatic transmission systems have a defined set of gear ratios, plus a parking pawl that locks the output shaft of transmission when the vehicle is parked. Instead of a clutch, a torque converter is generally used by automatic transmission systems, to manage the connection between the transmission system and the engine of the vehicle. Besides fully automatic transmissions, several other types of transmissions are available, such as continuously variable transmissions (CVT) and semi-automatic transmissions.

Predominantly, automatic transmission systems are hydraulically operated. Basic components may include a torque converter connected to the engine of the vehicle, and a set of planetary gears that facilitate conversion between different gear ratios within an available range. The torque converter connects the engine to the transmission system of the vehicle, and acts as a substitute the mechanical clutch that is used in manual transmission systems. The planetary gear set, generally being a compound planetary gear set, includes a set of bands and clutches actuated by hydraulic servos to provide the different forward gear ratios.

Many of the automatic transmission are select-shift type transmission, where, in the drive mode, in order to perform the gear upshift and downshift operations, the driver has to activate a switch each time, when he/she intends to step-up or step-down from the current gear position to a subsequent higher or a preceding lower gear position. The switch may be in the form of a select-switch/button provided over the steering wheel or a shift-lever, or the shift-lever itself. In a case where a vehicle is equipped with 10 or more high-speed gear ratios, for example, the driver may need to activate the switch multiple times to step-up the gear ratio from a lower gear position to a comparatively higher gear position, such as from gear position 2 to 8, or vice versa. Basically, the conventional automatic transmission systems step-up or step-down the gear ratio sequentially, and the driver cannot perform direct gear shift operations by skipping intermediate gears.

While driving on a curvilinear track and heading to a turn at high speed (i.e., at a top gear position), the driver may need to sudden drop-down to a much lower gear position, and if the turn follows a straight track again, then the driver may desire to speed up quickly to a top gear. In that case, multiple activation of gear-shift switch may be undesirable, and may also cause a delay in gear shifts. Rather, a manual drive mode transmission may provide a much better driving experience than an automatic transmission mode in those cases. Further, a sequential gear ratio change from a low gear position to a relatively higher gear position in a conventional automatic transmission system involves engagement or disengagement of multiple clutches that are not associated with the initial and the desired final gear position. Frequent actuation or deactuation of the clutches may also impact the stability of the hydraulic control system of the transmission, and may lead to undesirable clutch behavior and driveline torque disturbances.

The process of changing the gear ratio from a gear to another gear that is more than one gear step away may require multiple engagement/disengagement of clutches, causing an overall gear shift duration. A frequent engagement and disengagement of the clutch may also cause instability in the hydraulic control system, which may eventually lead to undesired clutch behavior or driveline torque disturbance.

Therefore, a need exists for a method and a system for operating a vehicular automatic transmission in manual mode, where the shifting of the gear ratio from one gear to another gear that is more than one gear step away, may be performed in a single step (i.e., by skipping the intermediate gears).

SUMMARY

In one aspect of the present disclosure, a method is presented for operating the automatic transmission of a vehicle, in which an improvement is recited, comprising manual skip-shift operation.

Another aspect of the present disclosure presents a method for operating the automatic transmission of the vehicle, including accepting the input of gear states and operating a selector mechanism to select a value. The accepting action accepts input of a selected sequence of gear states from a plurality of available gear states, the selected sequence including fewer gear states than the number of available gear states. The operating action includes operating a selector mechanism to select the gear state from the selected sequence.

A further aspect of the present disclosure sets out an automatic transmission system. The system includes a repository of available gear states, and electronic control module, a selector mechanism, and a powertrain control module. The electronic control module is operatively connected to the repository, and it is configured to accept input of a selected sequence of gear states from among the available gear states. The selector mechanism is operatively connected to the electronic control module to identify a selected gear from the selected sequence. The powertrain module is operatively connected to the electronic control module, to implement the selected gear on the automatic transmission system.

BRIEF DESCRIPTION OF THE DRAWINGS

FIG. 2 (b) illustrates an embodiment where a select-switch is provided together with a gear shift lever, and where the select-switch can be activated to initiate the gear skip-shift operations of the present disclosure.

FIG. 2 (c) depicts a select-switch provided together with a steering wheel, according to the present disclosure.

DETAILED DESCRIPTION OF ILLUSTRATIVE EMBODIMENTS

The following detailed description illustrates aspects of the disclosure and its implementation. This description should not be understood as defining or limiting the scope of the present disclosure, such definition or limitation being solely contained in the claims appended thereto. Although the best mode of carrying out the invention has been disclosed, those in the art would recognize that other embodiments for carrying out or practicing the invention are also possible.

DEFINITIONS

The following definitions will be used in this document:

Down-switch—A driver operated switch that causes the automatic transmission system to shift directly to the next lower programmed gear choice.

Gear—A mechanism for transferring power from the engine of a vehicle to the drive wheels in which there is a specific ratio of rotations of the engine to rotations of the drive wheels.

Gear state—The information required by an automatic transmission system to implement a given gear ratio.

Selector Position—One of the several positions that can be assumed by a selector mechanism.

Selector Mechanism—A device to allow the driver to instruct the electronic control module to identify which gear the driver wishes the vehicle to use. Examples of a selector mechanism might be shift levers, shift buttons, voice operated commands or other selection technologies known in the art.

Skip-Shift—A technique for shifting forward speed gears in which the gears are not shifted through in strict sequential order but rather some of the gears are intentionally skipped. For example, shifting directly from first to fourth gear, skipping second and third gears.

Sequential Order—An ordering of gear choices such that each gear has the next higher or next lower gear ratio relative to the gear preceding it of the gears available in the vehicle. For example, first gear, second gear, third gear, fourth gear.

Not in Sequential Order—An ordering of gear choices such that a gear does not have the next higher or lower gear ratio relative to the gear preceding it of the gears available in the vehicle. For example, first gear, fourth gear, seventh gear, tenth gear. Another example would be ninth gear, sixth gear, third gear, first gear.

Up-switch—A driver operated switch which causes the automatic transmission system to shift directly to the next higher programmed gear choice.

Vehicle—A motorized transportation conveyance which can carry passengers or cargo. It includes passenger vehicles, trucks, buses and motorized mobile equipment. The engine can be gasoline powered, diesel powered, electric powered, hybrid or other powering mechanisms known in the art.

Figure 1:
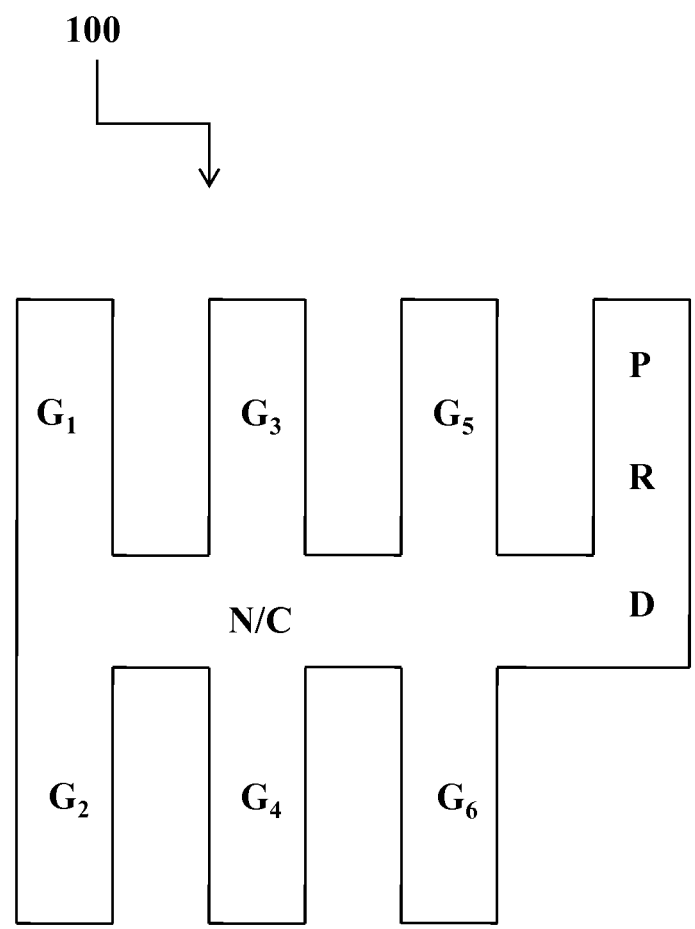
FIG. 1. is a schematic view of a shift gate on which a gear shift lever can perform gear skip-shift operations, according to the present disclosure.

FIG. 1 is a schematic view of a shift-gate incorporated into the gear shift lever assembly of a vehicle, on which a gear shift lever can be manipulated into different slots. An embodiment of the present disclosure can operate by emulating a manual transmission system. As can be seen, the gearshift pattern illustrated in FIG. 1 resembles that of a manual transmission having six forward speeds. A gear shift lever (not shown) can be moved into different positions for the various gears. In common with conventional automatic transmissions, one row of the shift pattern provides the three basic modes, parking (P), reverse (R), and drive (D). An additional position for neutral (N) may be provided as desired. When the selector is in Drive mode (D), the automatic transmission changes among the various gear states according to predetermined criteria.

Although not available on all automatic transmission vehicles, some systems allow the driver to activate a manual shifting mode from the Drive position, giving the driver full control over shifting among gear states. Lever positions such as G1, G2, G3, etc., are provided to emulate the feel of a manual transmission.

It should be noted at this point that the availability of a large number of forward gear choices, noted above, allows the driver the option of skipping some of the gear states. This possibility did not exist in traditional manual transmissions having a limited number of available gear states. Three forward speeds was for some time the standard number of forward gear choices, and even in recent years the availability of more than four choices was rare. With such widely spaced gear states, one needed to progress through each of the available ratios in sequence to achieve a smooth acceleration or deceleration. With 10 or more forward gear states available, however, the modern driver may be able to skip some gear choices without sacrificing either acceleration or fuel economy.

According to the present disclosure, a subset of the full range of available gear states, referred to here as the "selected gear states," may be chosen for use in a particular scenario. The selected gear states may be input to an electronic control module, and any of several selection methods may allow the driver to employ the selected gear states rather than the entire set of available gear states. Methods and systems for making use of this capability are set out below.

Conventionally, the gearshift lever on a manual transmission physically moves to engage the various gear combinations available. In alternate embodiments, gear selection can be made with devices such as pushbuttons. In some embodiments of the present disclosure, each position of the shift lever, the "selector position", activates a position sensor or device which communicates that position to the electronic control module, which then engages the appropriate mechanical and hydraulic devices to select the chosen gear state. Specifically, position sensors may be provided and configured to sense the instantaneous selector position on a shift gate and dispatch signals to a power train control module of the vehicle, indicating the desired gear state.

The different selector positions are programmable to associate a given position with a particular selected gear state. Thus, appropriate sensing and signaling apparatus can detect the selector position and signal the driver's choice. Previously, where multiple selector positions were provided, each selector position was associated with a single, fixed gear state. Moreover, gear states were arranged in sequence and could not be altered. Here, a driver may assign a specific selector position to any of the available gear states. In an illustrative example, a vehicle's transmission offer 10 forward gear states; the driver may assign X1=2, X2=4, X3=5, X4=7, X5=9 and X6=10, where: Xi ($1 \leq i \leq 10$) denotes the new gear position/value assigned to the default selector position Gi.

For example, a driver entering a relatively uncrowded, flat, freeway may wish to accelerate rapidly. That result can be accomplished by skipping a number of gear positions, as in the following pattern: X1=1, X2=3, X3=7. The particular chosen pattern may depend on factors such as prevailing driving conditions, the expertise of the driver, or simply individual preferences. Once programmed, the new assigned gear positions may override any default gear positions. For example, if X1=2, then positioning the shift lever at G1 will select forward gear state 2, as opposed to the earlier default gear state 1 (i.e., G1).

As can be imagined, the embodiment described above would allow a driver to select any chosen combination of gear states and to assign those ratios to specific selector positions. An electronic control module receives the signal indicating the gear selector position, associates that position with the programmed gear state, and then signals a power train control module which gear state to engage. The electronic control module may include a primary repository where default gear states (i.e., G1, G2, G3, etc.) corresponding to specific position of the shift lever may be stored, as well as one or more secondary repositories where the new assigned gear states (i.e., X1, X2, X3, etc.) may be stored.

It will be further understood that the system may shift directly from one programmed gear state to another, or some intermediate shifting may be chosen. For example, if G2 is assigned to gear state X2=4, and the vehicle is currently driven in gear G1, then positioning the shift lever from G1 to G2 can result in two different patterns. In a basic pattern, the system may shift directly from G1 to G4. In a "smoothing" mode, however, the system may choose an intermediate value, so that even though the driver indicates a shift directly from G1 to G4, the system may actually engage intermediate values, so that the transmission sequentially and rapidly moves from G1 to G2 to G3 to G4. In either event, the driver performs a skip-shift operation, because the selector lever is moved directly from G1 to G2.

Safety considerations may dictate that the designation of new selector positions be bound by certain constraints. One should avoid gear changes that produce sudden acceleration or deceleration, which may be dangerous. For example, some embodiments forbid skipping more than a designated number of gear states between sequential programmed choices. Thus, in a pattern starting at G1, the driver may not be allowed to step-up directly to a gear state beyond gear ratio 4, because such a move could produce a strong jerk. Similar rules, regarding either general topics, such as the number of gear positions that can be skipped, or specific rules, tied, for example, to the number of gears that may be skipped from G1, may be programmed into the electronic control module. As a secondary precautionary measure, the electronic control module may be configured to provide a visual or a verbal warning signal to the driver, indicating inappropriate designation of the new gear positions. In another embodiment, certain authorizations or passwords might be required to access the electronic control module and effect changes in gear positions. For example, a parent might wish to specify the gear positions and not permit a child to change the gear positions.

Figure 2:
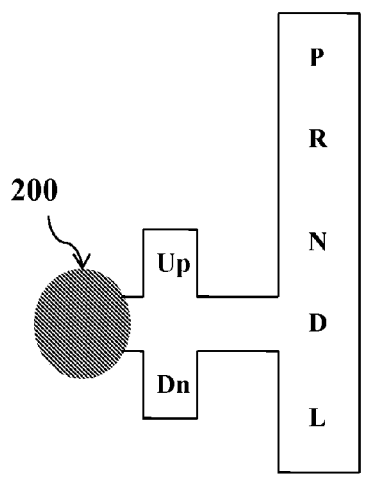
FIG. 2 (a) illustrates an embodiment where the gear skip-shift operations of the present disclosure can be initiated through a gear shift lever.
Figure 2:
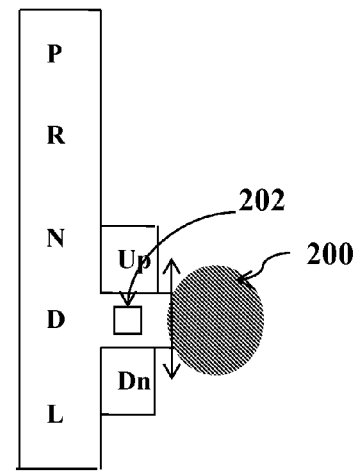
Figure 2:
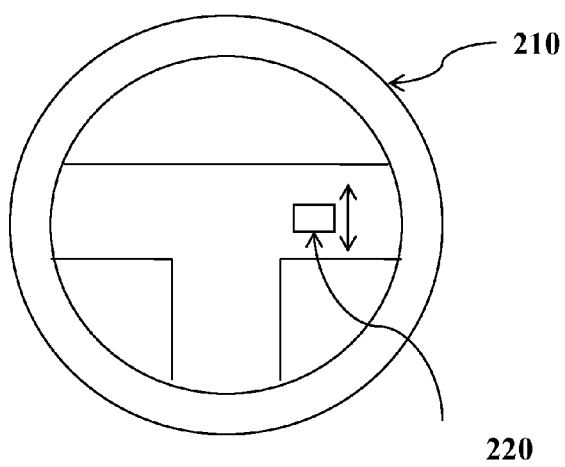

FIG. 2 (a) is a schematic view of a shift gate where a shift-lever 200 can be moved among the usual modes of an automatic transmission system, including the parking (P), reverse (R), neutral (N), and drive (D). In terms of mode selections, forward gears indicated by D may be subdivided into a low range (L), useful for hilly driving. Modes are chosen by moving the shift lever up and down along the track from P to L. The illustrated system does offer a number of selectable forward gears, and those selections are implemented by moving shift lever 200 up or down to the D position, and then moving the shift lever 200 to the left, engaging the secondary Up/Down track.

In the illustrated embodiment, the transmission system is semi-automatic, where, while being in the drive mode, the shift lever 200 need to be activated each time along the upshift direction or the downshift direction (as shown) to perform sequential gear step-up or step-down operations, as opposed to the case where the shift lever could be positioned in different default gear positions, shown earlier in FIG. 1.

Once in the up/down track, the driver can select individual gear states by moving shift lever 200 to the up position to shift up or to the down position to shift down. In some embodiments, the up and down positions are spring-loaded, allowing the shift lever to advance into the designated slot and then urging the shift lever back to the middle position.

Conventionally, a driver is restricted to the preset gear states, which may require a great deal of manual action before significantly changing the gear state. According to the present disclosure, a new specific gear position may be assigned overriding the default gear position. In that manner, the driver may assign a set of gear states that would allow one to traverse a selection of 10 forward speeds in only four shifts, for example. Once assigned, the electronic control module commands the power train control module to provide the selected new gear states. Alternatively, as noted above, the system may automatically select gear states between the current selection and the chosen selection to smooth out the gear shifting operation.

In this manner, the need to activate the shift lever 200, multiple times, along the upshift or the downshift direction, to perform gear shifts, is avoided. For example, driving currently in gear position 4, if the driver desires to quickly shift up to the highest of 10 forward gear positions, a typical designation of the new gear positions can be X1=7, X2=10. Here, Xi corresponds to the ith state of activation of the shift lever above the current gear position. As can be seen, the driver can quickly shift to the top gear, from the current gear (i.e., gear 4), in only two activations of the shift lever, compared to the normal mode of operation of the transmission system where the shift lever needed to be activated 6 times to step-up to the top gear, in the current example.

FIG. 2 (b) illustrates an embodiment where a shift button 202 is provided over the shift lever 200, to facilitate gear shift operations in the drive mode. Normally, to step-up or step-down the gear positions sequentially, the shift button needs to be activated upwards or downwards, each time, along the shown arrow. According to the present disclosure, once a driver assigns new specific gear positions to each state of activation of the shift button, then each specific activation of the shift button along the upward or downward direction, commands the power train control module to provide a gear state between the corresponding assigned new gear position and the current gear position.

FIG. 2 (c) illustrates an embodiment where the gear-shift selector, configured to facilitate gear-shift operations, is in the form of a select switch/button 220 provided over the steering wheel 210 of the vehicle. When the vehicle is in the drive mode, to step-up or step-down the gear position, the button 220 can be activated upwards or downwards, respectively. In the illustrated embodiment, according to the present disclosure, a user can assign new gear states to the different states of activation of the 220, and perform gear shift operations directly between different gears selected from the full range of available gear states, by skipping the intermediate gears.

In another embodiment, some of the features previously taught can be combined. For example, a vehicle might have both the shift gate of FIG. 1 and the gear-shift selector of FIG. 2(c). The user moving the selector button up or down might override the shift-gate position of FIG. 1 and change the gear to the next selected gear.

Figure 3:
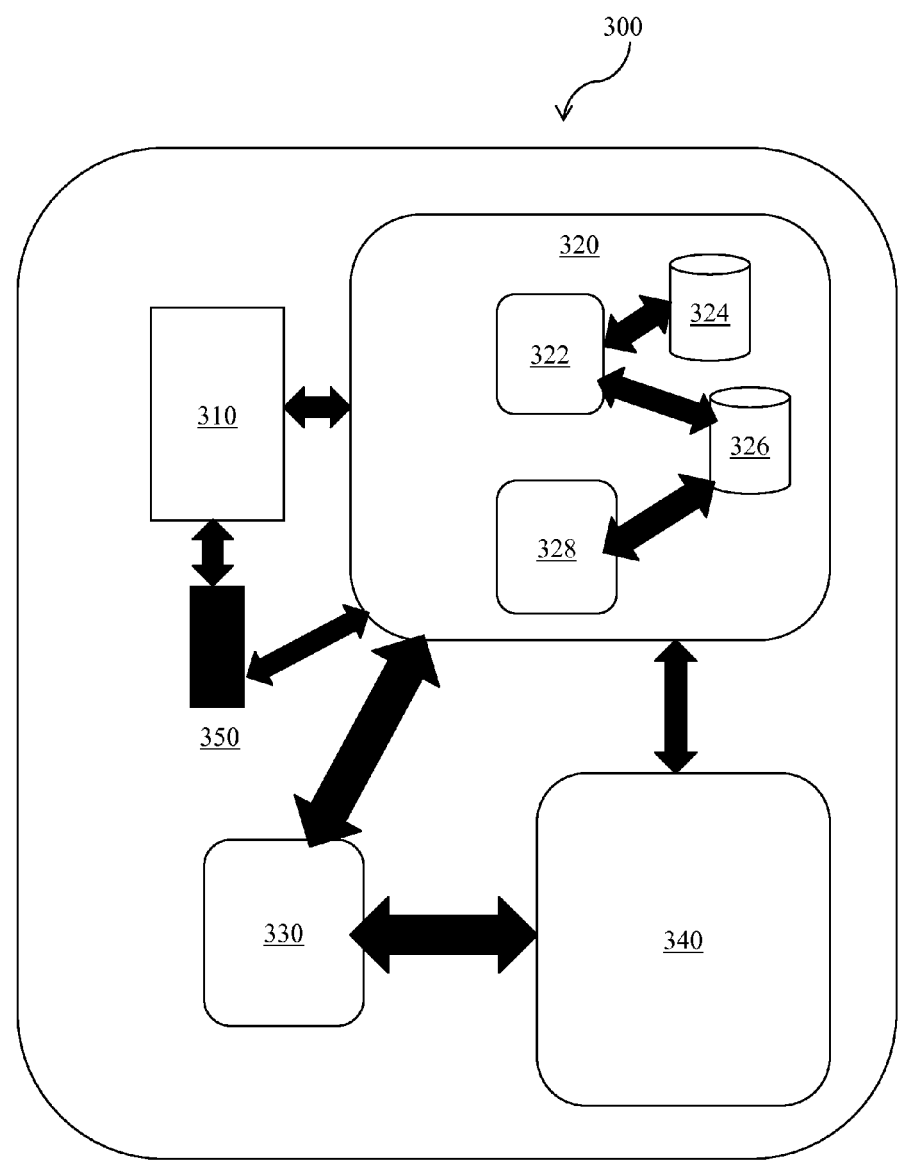
FIG. 3 illustrates the different integral components of an exemplary system for performing gear skip-shift operations, according to the present disclosure.

FIG. 3 illustrates an exemplary system 300 for performing gear skip-shift operations, according to an embodiment of the present disclosure. The system 300 includes a gear-shift selector 310 configured to facilitate gear shift operations. The gear-shift selector is connected to an electronic control module 320, and may be a shift lever configured to be moved along a shift gate, a select-switch/button provided over the shift lever or the steering wheel of the vehicle, or other selector mechanism known in the art. Each specific activation of the gear-shift selector in the drive mode is configured to step-up or step-down the gear state.

The electronic control module 320 includes a user interface 322 that may be positioned at a front portion of the vehicle, such as, over the dashboard, near the steering wheel, or at any other appropriate position easily visible to the driver. While positioning the user interface 322, one does want to ensure that the driver's forward visibility is not impaired.

The user interface 322 renders suitable user selectable options for the driver to assign new specific gear position corresponding to each specific activation of the gear shift-selector 310. In an embodiment, the user interface 322 may render graphical objects displaying available default gear positions above or below the current gear positions, and input fields in front of the default gear positions that can be filled in by the driver to provide the new assigned gear positions, to override those default gear positions. The rendered graphical objects appropriately change based on a change in the current gear position.

When a new set of gear positions is assigned, those new gear positions are stored as fields in a secondary repository 326 of the electronic control module. The primary repository 324 is configured to store the default gear positions corresponding to different states of activation 310. For example, if the gear-shift selector 310 is a shift-lever, then the default gear positions G1, G2, G3, etc., as explained earlier in conjunction with FIG. 1, may be stored in the primary repository 324, and the new assigned gear positions Xi (i.e., X1, X2, etc.) may be stored in the secondary repository 326.

A sensor 350 is coupled to the gear-shift selector 310, and it senses the location of the shift-selector 310. In a case where the shift-selector 310 is a shift-lever, the sensor 350 may be a position sensor configured to identify the position of the shift-lever over the shift-gate. On detecting activation of the gear shift-selector 310, the sensor 350 provides a signal to the electronic control module 320, indicating the activation. In response to that signal, the electronic control module 320 might first determine if an assigned gear position corresponding to the state of activation of the gear-shift selector exists in the secondary repository 326 and, if so, uses that gear position. If no assigned gear position exists, then the electronic control module 320 might uses the default gate position stored in the primary repository 324. Once the gear position is identified, the electronic control module provides a corresponding signal to a power train control module 330 coupled thereto.

Eventually, the power train control module 330 adjusts the transmission system 340 of the vehicle to provide a gear state between the new assigned gear position and the current gear position, in a case where the driver has assigned a new specific gear position corresponding to that state of activation, or a gear state between the default gear position and the current gear position, in a case where no such new gear states have been assigned.

As noted above, a skip shift operation may be implemented within the automatic transmission by moving directly from an existing gear state to a desired gear state, such as from G1 to G4, or the system may automatically move through intermediate states. In the latter condition, the automatic transmission will move from G1 to G4 by shifting from G1-G2-G3-G4. The system may provide a setting to allow an operator to choose either of those patterns.

In an embodiment, the electronic control module 320 includes a voice recognition module 328 configured to obtain and recognize the driver's voice commands pertaining to gear-shift operations. In such an embodiment, the driver does not need to provide manual inputs to the user interface 322, for designating new gear positions. Rather, a pre-defined voice command will suffice in those cases. Such voice recognition modules are well known in the art, and are often incorporated in the 'SYNC' systems used in many recently manufactured vehicles, for obtaining a driver's voice command for making phone calls, controlling the infotainment system of the vehicle, etc.

The voice commands for performing gear upshift and downshift operations may be pre-defined and programmed in the electronic control module 320. For example, typical voice commands for stepping-up or stepping-down the gear state may be abridged expression of speech pairs, such as 'upshift' and 'downshift', or "step-up" and "step-down", etc. Further, corresponding to each expression of such a voice command, the driver may assign new gear positions, based on his/her desire. In a typical case, where the driver wants to quickly upshift from gear position 3 to the top gear in a 12-speed automatic transmission, the driver may designate a skip-shift to a gear position '(n+2)', from a gear position 'n', on each expression of the voice command "upshift", and a skip-shift to gear position '(n−2)', on each expression of the voice command 'downshift', where 'n' represents the current gear position. Accordingly, the new assigned gear position may be input by the electronic control module, and stored in one of its repositories. Once the driver's voice command is recognized by the voice recognition module 328, the electronic control module passes a corresponding signal to the power train control module 330, which eventually adjusts the transmission system 340 to provide the gear state between the new assigned gear position and the current gear position automatically.

In some embodiments, on recognizing the driver's voice command, electronic control module 320 is configured to render a confirmation message, seeking confirmation from the driver before executing the gear skip-shift command. Such a confirmation message may be a visual or a verbal message displayed on the user interface 322, or may also be in the form of an audible sound.

The embodiment described above, where the gear skip-shift operations are performed through voice based commands, avoids the need for the driver to express longer expressions such as 'upshift to gear position 5', or, 'step-down to gear 2', for example. The electronic control module 320 automatically identifies the corresponding new gear position that the driver desires to step-up or step-down to, from the stored newly assigned gear positions, and provides corresponding signals to the power train control module 330. In an embodiment, the audio recognition system might be uniquely keyed to the user's voice or user might need to state an unusual or code word to effect the audio signaled gear change so that noises by other occupants in the vehicle do not effect an undesired gear change.

Further, the assigned gear positions, stored in one or more secondary repositories 326 of the electronic control module 320, are editable, and therefore, the driver may designate a new set of gear positions to override the previously assigned gear positions, and input those values to the electronic control module 320.

The transmission system 340 may be a semi-automatic, fully-automatic or a continuously variable transmission (CVT) system, configured to facilitate sequential gear upshift and downshift operations between certain gear ratios.

The disclosed method and system for performing gear skip-shift operations between a pre-selected set of gear positions selected among the full range of gear positions, can be implemented in any vehicle incorporating a semi-automatic transmission, continuously variable transmission, or a fully automatic transmission system. The disclosed method substantially avoids the need to carry out multiple activations of the gear shift-selector, for performing gear-shift operations, and hence provides a better driving experience compared to a usual automatic transmission system, in certain cases.

Although the current invention has been described comprehensively, in considerable details to cover the possible aspects and embodiments, those skilled in the art would recognize that other versions of the invention are also possible.

We claim:

1. A method for operating an automatic transmission of a vehicle, comprising:
  accepting input of a selected sequence of gear states from a plurality of available gear states, the selected sequence including fewer gear states than the number of available gear states;
  operating a selector mechanism to select a gear state from the selected sequence, wherein the selected sequence of gear states is configured to override a default sequence of gear states prestored within a transmission system, during a drive mode of the vehicle.

2. The method of claim 1, wherein a specific choice of gears is preprogrammed within a repository to permit selection of gears not in sequential order.

3. The method of claim 2, wherein the selector mechanism comprises a voice recognition system.

4. The method of claim 2, wherein the specific choice of gears is preprogrammed by a user of the vehicle.

5. The method of claim 2, wherein the preprogrammed choice of gears overrides a default choice of gear that otherwise would be chosen by the selector mechanism.

6. The method of claim 2, wherein the selector mechanism comprises a shift-gate.

7. The method of claim 2, wherein the selector mechanism includes an up-switch and a down-switch, and wherein operation of the up-switch causes automatic selection of a next higher gear above a current gear position, from the preprogrammed choice of gears, and operation of the down-switch causes automatic selection of a next lower gear below the current gear position, from the preprogrammed choice of gears.

8. The method of claim 7, wherein one or more of the up-switch and the down-switch are positioned on or proximate to a shift lever of the vehicle configured to perform gear shift operations.

9. The method of claim 7, wherein one or more of the up-switch and the down-switch are positioned on a steering wheel of the vehicle.

10. An automatic transmission system comprising:
  an electronic control module, configured to accept an input corresponding to a preselected sequence of gear states from a set of available gear states;
  a repository operatively coupled to the electronic control module and configured to at least temporarily store the preselected sequence of gear states, wherein the preselected sequence of gear states is configured to automatically override a default sequence of gear states prestored within the repository of the transmission system, during a drive mode of the vehicle;
  a selector mechanism, operatively connected to the electronic control module to identify a selected gear from the preselected sequence; and
  a power train control module, operatively connected to the electronic control module, to implement the selected gear on the automatic transmission system.

11. The automatic transmission system of claim 10, wherein the electronic control module is preprogrammed to permit selection of gears not in sequential order.

12. The automatic transmission system of of claim 11, wherein the preprogramming is performed by a driver or other user of the vehicle.

13. The automatic transmission system of claim 12, wherein the selector mechanism comprises a voice recognition system.

14. The automatic transmission system of claim 12, wherein the preselected sequence of gear states overrides a default choice of gears that otherwise would be chosen by the selector mechanism.

15. The automatic transmission system of claim 12, further comprising either or both of an up-switch which causes the choice of a next higher gear above a current gear, from within the preselected sequence of gear states, and a down-switch which causes the choice of a next lower gear below a current gear position, from within the preselected sequence of gear states.

16. The automatic transmission system of claim 15, wherein the up-switch, the down-switch or both up-switch and down-switch are positioned on or proximate to a shift gate.

17. The automatic transmission system of claim 12, wherein the selector mechanism comprises a shift-gate.

18. The automatic transmission system of claim 17, wherein the up-switch, the down-switch or both up-switch and down-switch are positioned on a steering wheel of the vehicle.

* * * * *